Jan. 7, 1964  W. H. HOWE  3,116,753
INDUSTRIAL PROCESS CONTROL APPARATUS
Filed Dec. 21, 1961
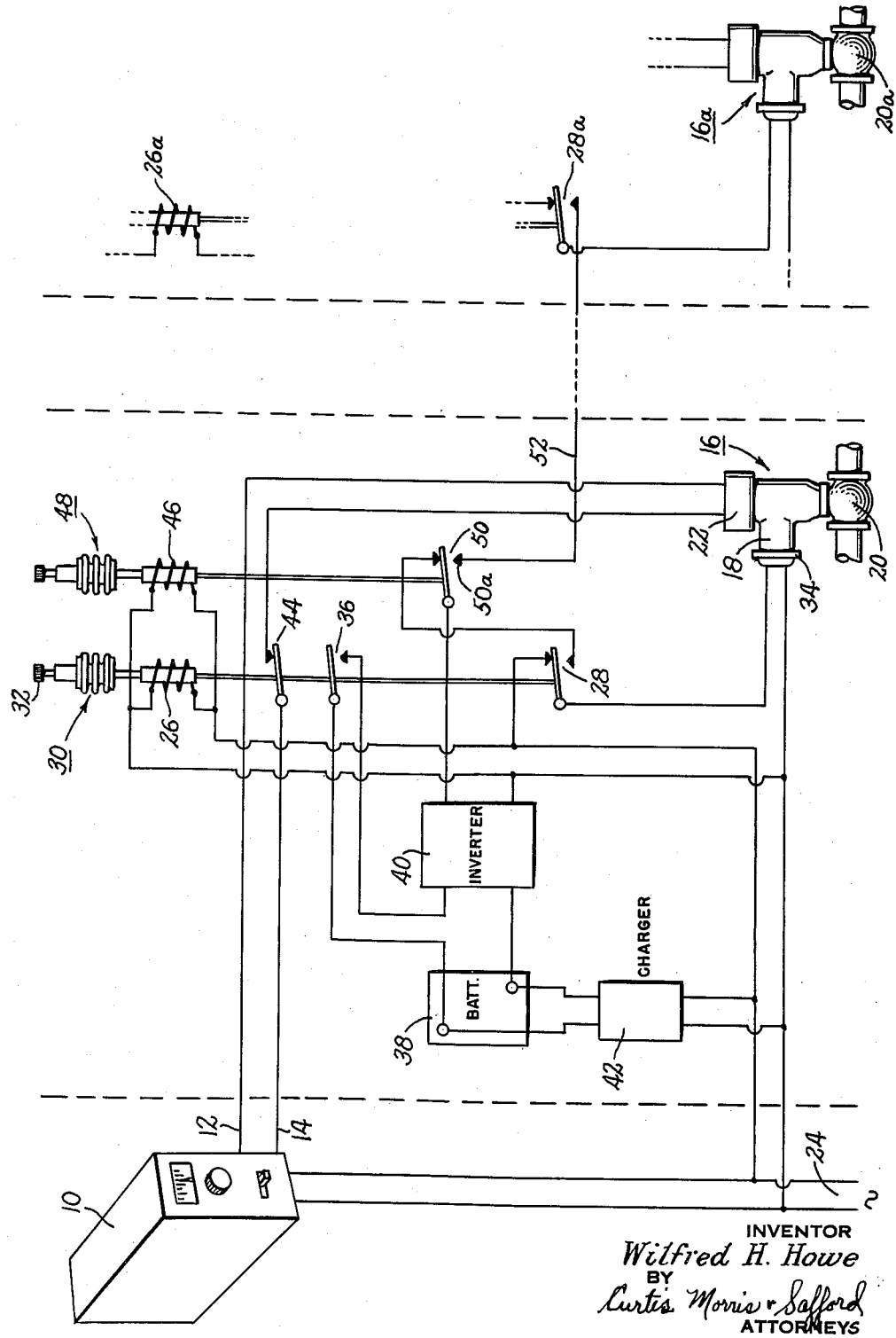
INVENTOR
Wilfred H. Howe
BY
Curtis, Morris & Safford
ATTORNEYS United States Patent Office 3,116,753
Patented Jan. 7, 1964

3,116,753
INDUSTRIAL PROCESS CONTROL APPARATUS
Wilfred H. Howe, Sharon, Mass., assignor to The Foxboro Company, Foxboro, Mass., a corporation of Massachusetts
Filed Dec. 21, 1961, Ser. No. 161,137
11 Claims. (Cl. 137—487.5)

This invention relates to electrically-operated industrial process control apparatus for maintaining constant a process condition such as temperature, flow rate and the like. More in particular, this invention relates to means for assuring safe operation of the process in the event of failure of the electrical supply.

A process control system typically comprises a valve or the like responsive to a control signal and arranged to effect variations in a process characteristic such as liquid flow rate, etc. In modern control systems, an electronic controller (see, for example, U.S. Patent 2,956,234) is used to develop the control signal preferably in the form of an electrical current, e.g. in the range of 10 to 50 milliamps. Conventionally, a "valve operator" having a drive motor is provided for positioning the process valve in correspondence with the magnitude of the control signal. For example, an A.-C. drive motor may be used together with a position-sensing follow-up device.

One obvious problem with such systems is the possibility of failure of the main electrical supply. Unless proper precautions are taken, serious damage can result from such failure not only because control will be lost, but also because many operating components of the process may be disabled. One approach to dealing with this problem is to provide a full-capacity auxiliary power supply, e.g. a diesel engine and alternator combination which is cut in immediately upon failure of the main electrical supply, to operate the process and its control system until the main electrical supply has been repaired. However, in many applications this approach is impractical due to the high cost of providing and maintaining such a large-capacity auxiliary power supply.

In an embodiment of the present invention, to be described hereinbelow in detail, there is provided a standby power supply adapted specifically to operate a process valve drive motor or the like. A switching relay energized by the main electrical power circuit serves, when actuated, to feed power from the main power circuit to the valve drive motor, and, when de-actuated, to energize the valve drive motor from the standby power supply. In the event of failure of the main power circuit, this relay is held actuated for a short period of time (e.g. 5 to 60 seconds) by a time-delay mechanism, and the process valve is maintained fixed in position during this period so that, if the power failure is only of momentary duration, the valve will be essentially at the correct position for continued operation of the process when power is restored.

If the main power remains off for a relatively long period of time, the switching relay ultimately will be de-actuated and thus will connect the valve drive motor to the standby power supply. Simultaneously, the valve operator directs the valve to a predetermined shut-down position, e.g. fully closed, and the standby power supply furnishes the energy for moving the valve to that position. After the valve has been closed, the standby power supply is disconnected from the valve drive motor, and is available for shifting other valves in the plant to their shut-down positions.

Since the standby power supply need only have a capacity sufficient for moving one or several process valves to a shut-down position, it can be relatively inexpensive and thus economically feasible. This arrangement, nevertheless, provides ample safety in assuring against valve movement during momentary failure of the main supply and, if ultimately necessary, in shutting the process down without damage.

Accordingly, it is an object of this invention to provide a process control system having improved means for preventing damage due to loss of electrical operating power. It is a further object of this invention to provide such a system which is economical to manufacture and reliable in operation. Still another object of this invention is to provide fool-proof means for automatically shutting down a process in the event of a prolonged failure of the main electrical supply. Other objects, aspects and advantages of the invention will in part be pointed out in, and in part apparent from, the following description considered together with the accompanying drawing which shows, in diagrammatic form, a preferred embodiment of this invention.

Referring now to the upper left-hand corner of the drawing, there is shown a controller 10 which preferably is of the type disclosed in U.S. Patent 2,956,234. This controller is arranged to receive a measurement signal from a condition-responsive instrument (not shown), and to transmit through conductors 12 and 14 a control signal, e.g. in the form of a current in the range of 10–50 milliamps. This control signal is directed to a valve operator, generally indicated at 16, including a drive motor 18 the output of which is connected through reduction gears and a shaft (not shown) to a valve 20. The drive motor preferably is a two-phase A.-C. motor operated with a conventional follow-up servo, e.g. including an amplifier 22 to receive the control signal and to produce an A.-C. voltage of reversible phase for the motor, and an output slide-wire potentiometer responsive to the valve position to produce a D.-C. feedback signal to null the control signal when the valve is properly positioned. Such follow-up systems as shown on page 131 of the July 1961 issue of Control Engineering are common in the art, and hence will not be described in detail herein.

The A.-C. power for the valve operator 16 normally is furnished by a main A.-C. power circuit 24 which, in the arrangement disclosed, also furnishes power for the controller 10 as well as for the process apparatus such as pumps, etc. (not shown). A switching relay 26 is energized by this main power circuit 24, and has contacts 28 to connect the valve operator 16 to the power circuit when the relay is in actuated condition (as shown). This relay includes time-delay means 30 to provide an adjustable delay (e.g. from 5 to 60 seconds) between de-energization and de-actuation of the relay. Preferably, this time-delay means is mechanically operated, i.e. without requiring electrical power, and as disclosed herein includes a pneumatic bellows arrangement, with an adjustable leak 32, to hold the relay armature in actuated position until the air in the bellows has been forced out through the leak. Such a time-delay arrangement is conventional, and a relay of this type is available commercially under the trademark Agastat.

When a failure occurs in the main A.-C. power circuit 24, the relay 26 will remain actuated for a short time, due to the delay mechanism 30. However, during this time A.-C. power will of course be lost at the valve operator 16. To assure that there is no immediate change in the valve position, the valve operator is provided with means to maintain the drive motor 18 locked in position while the power is off. This means is shown herein as a conventional spring-powered brake 34 which normally is held in non-braking condition by a solenoid or the like energized from the A.-C. voltage supplied to the motor. However, it should be understood that other means may be provided for this purpose, e.g. the motor drive and gearing may be so arranged that no change in position will occur during absence of A.-C. power.

If the A.-C. power failure continues beyond the time delay period of the relay 26, this relay will be de-actuated and its contacts 36 will close to connect a battery 38 to an inverter 40. Battery 38 is maintained in charged condition, during normal operation, by a charger 42 which is energized from the main A.-C. power circuit 24. Upon de-actuation of the relay 26, the A.-C. output of the inverter 40 is connected through relay contacts 28 to the valve operator 16 to furnish power for operating the valve 20 to its predetermined shut-down position, in this case fully closed.

Typically, a process valve operator will be designed to shift the valve to its fully-closed position when the control signal goes to the lower end of its range (10 ma.) or below. Since in the disclosed system the controller 10 is energized from the main A.-C. power circuit 24, failure of power on this circuit will cause the controller output to go to zero. Thus, the input to the valve operator will necessarily be zero, and, after the relay 26 is deactuated, the valve 20 will be driven fully closed by the A.-C. power received from the standby power supply comprising the inverter 40 and battery 38. Some control systems may, of course, be so arranged that the controller output will not go to zero when the main A.-C. power for the valve operator fails, and in such circumstances the relay 26 may be provided with additional contacts 44 to open the line 14 and thereby positively "zero" the input to the valve operator 16, to cause the valve to be driven to its fully-closed position.

If the process shut-down position for the valve 20 is other than fully closed, it will be apparent that a control signal of finite magnitude could be developed from the battery 38, and this signal applied to the valve operator input by relay contacts, such as contacts 44, to cause the valve to be driven to the desired position when the relay is de-actuated.

The system also is provided with a second relay 46, energized from the main A.-C. power circuit 24, and having time-delay means 48 adjusted to de-actuate relay 46 after a time period sufficient to permit the valve 20 to be driven to its shut-down position. This relay 46 includes contacts 50 to disconnect the standby A.-C. power from the valve operator 16 after valve 20 has been closed.

In some situations, it may be advantageous to switch the standby power supply to still another valve operator, or group of valve operators, for the purpose of driving the corresponding valves to their shut-down positions. This is illustrated by the lead 52 connected from relay contact 50 to the contacts 28a of a time-delay relay 26a energized by the main A.-C. power circuit and adapted to control the A.-C. supply for another valve operator 16a. (Note: Identical reference numerals have been used with different suffixes to denote similar components in two separate process valve control systems.) As in the previously-described system, relay 26a is deenergized when the main A.-C. power line fails, and is de-actuated a short time later to complete a connection from lead 52 to the valve operator 16a. Subsequently, when relay 46 is de-actuated, its contact 50a connects the output of inverter 40 through lead 52 to the valve operator 16a, which thereupon drives valve 20a to its shut-down position.

The standby power supply comprising battery 38 need only have sufficient capacity to drive one or a group of valves to their shut-down positions. Such a power supply can be provided economically, particularly since driving any one valve to its fully-shut position normally will take only about 10 to 20 seconds at the maximum. To prevent excessive drain on the standby power supply after the plant has been shut down, the relay 26 may be arranged to open contacts 36 after a period of time sufficient to completely shut down the process.

Although a preferred embodiment of the invention has been set forth in detail, it is desired to emphasize that this is not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

I claim:

1. In an industrial process control system of the type having a process controller adapted to receive a condition measurement signal and to produce a corresponding control signal for transmission to a remotely-located operating device for adjustably setting a characteristic of the process, and wherein electrical means responsive to said control signal are provided for setting said operating device in accordance with said control signal; the combination of a main power circuit for furnishing electrcal power to various components including said electrical means during normal operation of the process, a low-capacity standby power circuit adapted to operate said electrical means upon failure of said main power circuit but having insufficient capacity for continued operation of the progress, relay means responsive to the voltage of said main power circuit and including switch means arranged when operated to connect said standby power circuit to said electrical means after failure of said main power circuit, time delay means for preventing operation of said switch means for a preset time period after failure of said main power circuit, means for maintaining said electrical means in fixed condition while power is cut off at said electrical means, and said controller including means operable after said preset time period for directing said operating device to a predetermined shut-down condition while said operating device is energized by said standby power circuit.

2. Apparatus as claimed in claim 1, wherein said electrical means comprises a drive motor for positioning a process valve, said means for maintaining said electrical means in fixed condition comprising brake means operable in response to loss of electrical power for holding the output shaft of said drive motor in a fixed position.

3. In an industrial process control system of the type having a process controller adapted to receive a condition measurement signal and to produce a corresponding control signal for transmission to a remotely-located operating device for adjustably setting a characteristic of the process, and wherein electrical means responsive to said control signal are provided for setting said operating device in accordance with said control signal; the combination of a main power circuit for furnishing electrical power, relay means responsive to the voltage of said main power circuit and including first contact means for connecting said main power circuit to said electrical means when said main power circuit is properly energized; a standby power circuit, said relay means including second contact means arranged to connect said standby power circuit to said electrical means after loss of power on said main power circuit; time delay means for delaying operation of said second contact means for a preset time period after loss of power on said main power circuit, means for maintaining said electrical means in fixed condition while power is cut off at said electrical means, and means operable after said preset time period for directing said operating device to a predetermined shut-down condition while said operating device is energized by said standby power circuit.

4. In an industrial process control system of the type having a process controller adapted to receive a condition measurement signal and to produce a corresponding control signal for transmission to a remotely-located process valve or the like, and wherein electrically-operated drive means responsive to said control signal are provided for actuating said process valve in accordance with said control signal; the combination of a main power circuit for furnishing electrical power to operate said drive means, switch means serving when actuated to connect said power circuit to said drive means, means connected to said main power circuit for actuating said switch means when said main power circuit is properly energized, a standby power circuit, said switch means serving when de-actuated to connect said standby power circuit to said drive means, time delay means for delaying deactuation of said switch means for a predetermined time period after loss of power on said main power circuit, means for maintaining said drive means in a fixed position during said time period, and means operable after said time period for directing said drive means to a predetermined shut-down position while said drive means is energized by said standby power circuit.

5. Apparatus as claimed in claim 4, wherein said drive means includes means for maintaining said valve in said shut-down position in the event that said standby power circuit is disconnected therefrom.

6. In an industrial process control system of the type having a process controller adapted to receive a condition measurement signal and to produce a corresponding control signal for transmission to a remotely-located operating device having means for adjustably setting a characteristic of the process, and wherein electrical means responsive to said control signal are provided for controlling said operating device in accordance with said control signal; the combination of a main power circuit for furnishing electrical power, first switch means serving when actuated to connect said main power circuit to said electrical means, means connected to said main power circuit for actuating said switch means when said main power circuit is properly energized, a standby power circuit, second switch means operable to connect said standby power circuit to said electrical means, time delay means for delaying operation of said second switch means for a predetermined time period after loss of power on said main power circuit, means for maintaining said electrical means in fixed condition upon the failure of power thereat, said switch means including means operable after said time period for directing to said operating device a control signal of predetermined magnitude to shift said device to its shut-down condition under power supplied from said standby power circuit, said switch means further including means to disconnect said electrical means from said standby power circuit after said operating device has been shifted to its shut-down condition.

7. In an industrial process control system of the type having first and second process controllers adapted to receive condition measurement signals and to produce corresponding control signals for transmission to respective remotely-located operating devices each including means for adjustably setting a corresponding process characteristic, and wherein first and second electrical means are provided responsive to the respective control signal for setting the corresponding operating device in accordance therewith; the combination of a main power circuit for furnishing electrical operating power during normal operation of the process, a standby power circuit, relay means responsive to the voltage of said main power circuit, said relay means including first and second switch means operable to connect said standby power circuit to said first and second electrical means respectively, time delay means for delaying operation of said first switch means for a preset time period after loss of power on said main power circuit, means operable after said time period for directing said first operating device to a predetermined shut-down condition while energized by said standby power circuit, said time delay means including means for operating said second switch means after an additional time period sufficient to permit said first operating device to be placed in its shut-down condition, and means operable after said additional time period for directing said second operating device to a predetermined shut-down condition while energized by said standby power circuit.

8. In an industrial process control system of the type having a process controller adapted to receive a condition measurement signal and to produce a corresponding control signal for transmission to a remotely-located process valve or the like, and wherein electrically-operated drive means responsive to said control signal are provided for actuating said process valve in accordance with said control signal; the combination of a main power circuit for energizing said drive means during normal operation of the process, a standby power circuit for energizing said drive means when there is a failure of said main power circuit; relay means actuated by said main power circuit, said relay means serving when actuated to connect said main power circuit to said drive means and, when deactuated, to connect said standby power circuit to said drive means; mechanically operable time-delay means for preventing deactuation of said relay for a preset period of time after loss of power on said main power circuit, said drive means being arranged to prevent any change in the control effect of said process valve during said time period; and means operable after said time period for applying to said drive means a predetermined shut-down control signal, said process valve thereby being operated to a shut-down condition by said drive means by power furnished through said standby power circuit.

9. Apparatus as claimed in claim 8, wherein said mechanically operable time-delay means comprises a pneumatic bellows device with an adjustable leak.

10. In an industrial process control system of the type having a process controller adapted to receive a condition measurement signal and to produce a corresponding control signal for transmission to a remotely-located process valve or the like, and wherein A.-C. operated drive means responsive to said control signal are provided for actuating said process valve in accordance with said control signal; the combination of said main A.-C. power circuit for energizing said drive means during normal operation of the process; a standby power circuit for energizing said drive means when there is a failure of said main power circuit, said standby power circuit including a battery with a charger therefor connected to said main power circuit and inverter means connectible to said battery to produce an A.-C. voltage; relay means actuated by said main power circuit, said relay means serving when actuated to connect said main power circuit to said drive means and, when deactuated, to connect the A.-C. output of said inverter means to said drive means; time delay means for preventing deactuation of said relay for a preset period of time after loss of power on said main A.-C. power circuit, said drive means being arranged to prevent any change in the control effect of said process valve during said time period; and means operable after said time period for applying to said drive means a predetermined shut-down control signal, said process valve thereby being operated to a shut-down condition by said drive means utilizing power furnished from said battery and inverter means.

11. In an industrial process control system of the type having a process controller adapted to receive a condition measurement signal and to produce a corresponding control signal for transmission to a remotely-located process valve or the like, and wherein electrically-operated drive means responsive to said control signal are provided for actuating said process valve in accordance with said control signal; the combination of a main power circuit for energizing said controller and said drive means during normal operation of the process, a standby power circuit for energizing said drive means when there is a failure of said main power circuit; relay means energizable by said main power circuit, said relay means serving during normal operation to connect said main power circuit to said drive means and, after power has been lost on said main power circuit, to connect said standby power circuit to said drive means; mechanically-operable time delay means for delaying connection of said standby power circuit to said drive means for a preset period of time after loss of power on said main power circuit, the control signal output of said controller being zero during loss of power on said main power current, said drive means being operable in response to said zero control signal to drive said valve to predetermined shut-down condition under power furnished by said standby power circuit.

References Cited in the file of this patent
UNITED STATES PATENTS

| | | |
|---|---|---|
| 1,882,473 | Beetem | Oct. 11, 1932 |
| 2,509,295 | Glass | May 30, 1950 |
| 2,847,179 | Payzer et al. | Aug. 12, 1958 |
| 2,948,295 | Smith | Aug. 9, 1960 |

UNITED STATES PATENT OFFICE
CERTIFICATE OF CORRECTION

Patent No. 3,116,753 January 7, 1964

Wilfred H. Howe

It is hereby certified that error appears in the above numbered patent requiring correction and that the said Letters Patent should read as corrected below.

Column 4, line 26, for "progress" read -- process --; column 6, line 40, for "said" read -- a --.

Signed and sealed this 7th day of July 1964.

(SEAL)
Attest:

ERNEST W. SWIDER
Attesting Officer

EDWARD J. BRENNER
Commissioner of Patents